April 4, 1961     A. J. PIERFEDERICI     2,978,068

VARIABLE DENSITY AIR FILTER PANEL

Filed Nov. 27, 1959

ALFRED J. PIERFEDERICI
INVENTOR.

BY Lawrence J. Winter
ATTORNEY

United States Patent Office 2,978,068
Patented Apr. 4, 1961

2,978,068

VARIABLE DENSITY AIR FILTER PANEL

Alfred J. Pierfederici, South Plainfield, N.J., assignor to Purolator Products, Inc., Rahway, N.J., a corporation of Delaware Filed Nov. 27, 1959, Ser. No. 855,822

8 Claims. (Cl. 183—63)

The present invention relates to a filter, and more particularly, to a panel-type filter for removing contaminants such as dirt an dust from air and other gaseous fluids.

An object of the present invention is to provide a novel type filter that may be used in air conditioning units, ventilating systems and heating units for removing dirt and dust from a moving stream of air.

In ventilating and heating systems and in refrigeration air conditioners, a blower or fan generally pulls or forces air through a duct or restricted opening, the air being used to ventilate, heat, or cool an area or rooms therein. A filter is usually provided downstream of the blower or fan so that any dirt or dust contaminants carried in the air stream may be removed therefrom, so as not to contaminate the space into which the air is passed. The filter is generally of a type known as a panel-type filter and is positioned in the air duct at right angles to or transverse to the path of flow of the air.

One difficulty encountered with panel-type air filters is due to the fact that the filter is not always of suitable capacity to properly filter the volume of air being sent through the duct. This is because the volume or quantity of air flowed through the duct is not always the same, but may be varied according to the need for ventilation, heated or cooled air. For example, in an air conditioning unit used on an extremely hot day, it is necessary to pump more air through the system in order to properly cool the room than is normally used, while in a heating system on a very cold day, it is necessary to increase the amount of hot air forced into the room for proper heating thereof.

In such systems where a conventional panel-type air filter is used, which commonly consist of an open rectangular frame within which a fibrous filtering medium is disposed, it is obvious that the most efficient and proper amount of filtering will not be accomplished, since the filter medium area presented to the stream of air cannot be adjusted for the volume of air being forced through the system when the fan is running at high speed, if the filter medium is designed for the low sped capacity, or vice versa.

In accordance with the present invention, an object hereof is to provide a panel-type filter to eliminate this difficulty, and provide the proper filter medium to efficiently remove dirt and dust from the air stream whether the air blower is running at high or low speed.

A further object of the present invention is to provide a panel-type air filter for removing dirt and dust from an air stream flowed therethrough in which the capacity of the filter medium may be readily adjusted to provide a high or a low density filter medium in accordance with the volume of air forced through the system or duct in which the filter is disposed.

Another object of the present invention is to provide a panel-type air filter with means for adjusting the filter medium to present a high or low density filter medium to the stream of air passed therethrough to efficiently filter various volumes of air forced therethrough, which filter will not cause an excessive pressure drop through the filter medium when a smaller quantity of air is forced therethrough and which will also properly filter any large quantity of air passed through the filter.

Another object of the present invention is to provide a panel-type air filter having a plurality of coarse and fine filter elements disposed therein with control or actuating means for adjusting the elements transversely of the stream of air passed through the filter to present a high density filter or a low density filter in accordance with the volume of air passed through the filter.

Another object of the present invention is to provide a panel-type air filter having a plurality of individual filter elements independently mounted therein, any of which filter elements may be readily removed for cleaning without disturbing any of the other filter elements and without removing the unit from the system.

Another object of the present invention is to provide a panel-type air filter of simple construction having a plurality of individual filter elements that may be individually removed and washed when they become clogged, replaced and used again without dismantling the entire filter.

Various other objects and advantages of the present invention will be readily apparent when considered in connection with the accompanying drawings forming a part thereof and in which.

Figure 5:
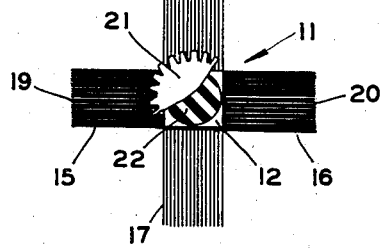
Fig. 5 is an enlarged detail view partly cut way, illustrating the construction of a filter element.

Referring to the drawings, the reference numeral 10 designates a rectangular filter frame that may be made of sheet metal, cardboard material or the like, but which is preferably made of molded resilient plastic material. Disposed within the rectangular frame are a plurality of vertical filter elements 11. The individual filter elements are provided with a vertical rectangular rod or member 12 preferably made of plastic material and extending substantially betwen the top 13 and bottom 14 portions of the frame. The sides of member 12 have a filter medium permanently fixed thereto, as is best seen in Fig. 5, wherein the inner ends of a large number of fine filter filaments or strands 15 and 16 are secured to opposite sides of the member to form a rectangular shaped longitudinally extending filter medium on each side of member 12. The filter strands 15 and 16 are made of a washable filtering material, such as polyethylene, polypropylene or the like, but may be made of any other suitable material desired, and a sufficient number are imbedded in filter element support member 12 to provide a filter medium of high density.

It will be noted that the outer ends of filaments 15 and 16 extend an equal distance from member 12, to provide filter mats or bats that are the same width. The depth or thickness of these filter brushes or mats is also the same so that the filter medium formed on both sides of member 12 have identical filtering efficiency and properties. The sides of member 12 opposite filter strands 15 and 16 are also provided with similar filter strands or filaments 17 and 18 imbedded therein, except that the strands are not as closely compacted or packed to provide low density filter mediums or bats. If desired, filaments 17 and 18 could be made of a different type of filtering medium or material than the bats formed by strands 15 and 16, the important object being that they have a low filter density or different filtering capacity than the other bats.

Figure 2:
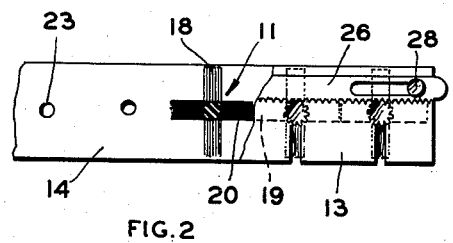
Fig. 2 is a fragmentary top plan view of the air filter with parts broken away to show a portion of the bottom of the filter frame.
Figure 4:
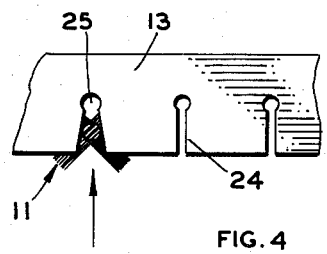
Fig. 4 is a fragmentary top plan view illustrating the means for mounting an individual filter element in the frame.

The filter elements 11 are disposed within frame 10, so that the outer ends or tips 19 and 20 of filter strands 15 and 16 make contact with and engage or intermesh with the tips or ends of the next adjacent filter elements 11, to provide a uniform filter medium across the path of flow of air passing through the filter. The upper end of member 12 is provided with a horizontal gear 21 (see Fig. 5) molded integrally therewith above a circular necked-in portion 22 disposed on top of the rectangular portion of the member. The lower end of member 12 is provided with a short cylindrical pin member extending therebelow which is inserted into the space recesses 23 (see Fig. 2) disposed in bottom 14. The upper end of each filter element is inserted in the resilient filter frame by snapping it into the spaced slots 24 laterally disposed in frame top 13, as shown in Fig. 4, so that the neck 22 of each filter element is locked in the circular portion 25 of these slots or grooves with the gear 21 disposed above the surface of frame top 13.

In inserting the individual filter elements 11 in frame 10, they should all be mounted therein so that the high density filter strands 15 and 16 or the low density filter mediums 17 and 18 are in proper alignment with each other, i.e., so that the filter strands 20 on one filter element is in lateral alignment with the filter strands 19 of the next adjacent filter element 11.

The individual gears 21 on each filter element 11 are disposed in their locked position in circular recesses 24 to mesh with the gear teeth of a rack or ratchet 26 made of plastic material disposed on top of member 13. Rack 26 has its front side provided with gear teeth 27 and is secured to top 13 by spindles 28 disposed on each end thereof, extending through slots 29 in the rack. The spindle and slot arrangement permit the rack to be moved laterally of the filter frame to rotatably adjust the filter medium from a high density filtering position to a low density filtering position, or vice versa.

Figure 1:
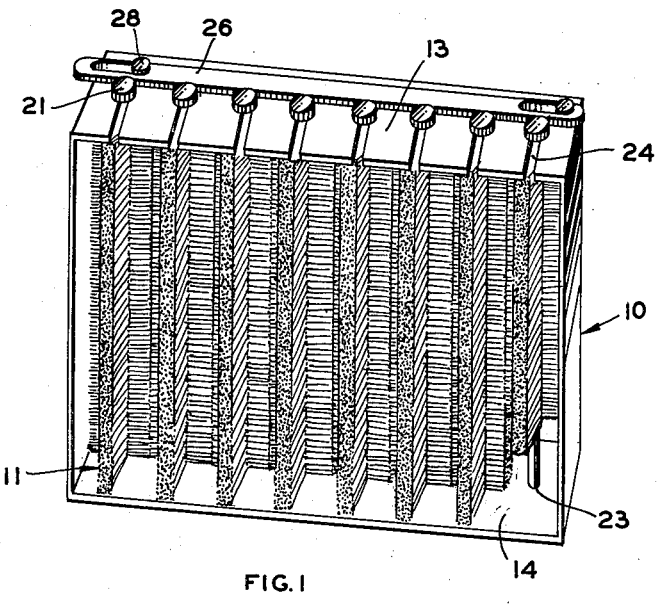
Fig. 1 is a perspective view of a panel-type air filter embodying the present invention.

When the air filter of the present invention is disposed in a duct or system in which a large volume of air is being passed therethrough and the fan or blower forcing the air therethrough is running at high speed, the filter medium is in the position shown in Fig. 1, with rack 26 disposed at its extreme left position, so that the high density filter medium is presented across the stream of air with filter strands 19 and 20 of each individual filter element being in alignment with each other to properly filter the large volume of air.

Figure 3:
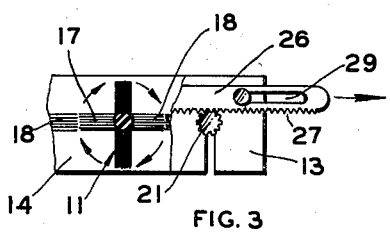
Fig. 3 is a fragmentary top plan view similar to Fig. 2, illustrating the direction of rotation of an individual filter element when the actuating means are adjusted.

When the volume of air forced through the system is reduced or decreased, rack 26 is moved to the right, as indicated by the arrow in Fig. 3, and the individual gears 21 of each filter element are rotated in the direction shown by the arrows 90 degrees, to present a low density filter medium across the air stream and align the filter mediums 17 and 18 on individual filter elements in lateral alignment with each other. This decreases the filtering capacity of the filter and thereby presents the proper filtering medium to the incoming air for proper filter efficiency and eliminates an excessive pressure drop through the filter medium which occurs in conventional panel-type filters.

Although the drawings show only the embodiment of a high density and a low density filter medium disposed on each filter element 11, it is apparent that there may be any number of an intermediate filter density medium disposed on each element to permit the filter to be readily adjustable for a blower or fan having three or more different speeds or air capacities passed through the filter.

It is thus apparent that the present invention provides a panel-type air filter system which may be readily adjusted to give the proper filtration of air in accordance with any variation in the volume of air passed therethrough. The present invention further provides a panel-type air filter of simple and economical construction which can be made entirely of plastic material, including the filter medium and supporting structure thereof and in which the individual filter elements disposed therein may be individually removed for washing and cleaning and replaced without dismantling the entire unit. Another feature of the invention is the fact that individual filter elements, if they become damaged, may be easily replaced without replacing the entire unit.

Inasmuch as various changes may be made in the particular form and arrangement of the several parts without departing from the essential principles of the invention, it will be understood that the invention is not to be limited, except by the scope of the appended claims.

What is claimed is:

1. A gas filter comprising a frame having an open front and back, a plurality of laterally spaced filter elements independently mounted therein, each said element having a high density and a low density section thereon out of alignment with said high density section, each said high density section being disposed thereon in alignment with the high density section of the next adjacent filter element, and each said low density section being disposed thereon for lateral alignment with the low density section of the next adjacent filter element transversely of said open front to filter gas passed therethrough, each said high density section being disposed on said filter element so they extend toward said open front and back when said low density sections extend transversely of said open front.

2. A gas filter comprising a frame having an open front and back, a plurality of laterally spaced filter elements independently mounted therein, each filter element having a high and low density section thereon out of alignment with said high density section, and means for rotating each said high density section into alignment with the high density section on the next adjacent filter element at one time and each low density filter section into alignment with the low density filter section on the next adjacent filter element at another time.

3. A gas filter comprising a frame having an open front and back, a plurality of laterally spaced filter elements independently mounted therein, a high density filter section and a low density filter section in each filter element, said low density section being out of alignment with said high density section and means for rotating said filter elements to move said high density filter sections in a position parallel to said front and back at one time, and said low density sections parallel thereto at another time.

4. A gas filter comprising an open frame, a plurality of detachably connected and laterally spaced filter members independently mounted therein, each member having a high density filter section and a low density filter section thereon out of alignment with said high density section, and gear and rack means for rotating said high density filter sections into alignment with each other and parallel to the open ends of the frame at one time, and said low density filter sections parallel thereto at another time.

5. A gas filter comprising an open frame, a plurality of laterally disposed filter members disposed in said frame, each said member comprising a vertical rod with high density filter medium secured on opposite sides of said rod and extending outwardly therefrom and low density filter medium secured on the sides of said rod adjacent said first mentioned sides, means for securing each said member within said frame, and means for rotating said members in said frame so said high density filter medium is parallel to the open ends of the frame at one time, and said low density filter medium is parallel thereto at another time.

6. The gas filter of claim 5 wherein said high and low density filter mediums have a uniform thickness throughout, and extend equal distances outwardly from both sides of said vertical rod.

7. A gas filter comprising frame having an open front and back side, a plurality of laterally spaced filter members disposed therein, each member comprising a vertical rod with high density filter medium secured to opposite sides of said rod and extending outwardly therefrom and low density filter medium secured to the sides of said rod adjacent said first mentioned sides, means for detachably connecting each member in said frame, a gear wheel on each said vertical rod, a movable rack disposed on said frame engaging each said wheel for rotating said rods one way to align the high density filter medium on each rod with the same medium on the next adjacent rod, and for rotating said rods another way to align the low density mediums on each rod with the same medium on the next adjacent rod.

8. The gas filter of claim 7 wherein each said high and low density filter medium is a washable material, is of uniform depth and extends an equal distance from the side of the vertical rod.

References Cited in the file of this patent

UNITED STATES PATENTS

| | | | |
|---|---|---|---|
| 1,088,952 | Wilkey | Mar. 3, | 1914 |
| 1,952,989 | Joseph | Mar. 27, | 1934 |
| 2,843,341 | Dannenberg et al. | July 15, | 1958 |

FOREIGN PATENTS

| | | | |
|---|---|---|---|
| 754,839 | Great Britain | Aug. 15, | 1936 |
| 1,034,841 | France | Apr. 15, | 1953 |